United States Patent
Bailly et al.

[11] Patent Number: 5,507,196
[45] Date of Patent: Apr. 16, 1996

[54] GEARSHIFTING ARRANGEMENT FOR ACTUATING MOTOR VEHICLE MULTI-SPEED GEARBOXES

[75] Inventors: Gerhard Bailly; Ünal Gazyakan, both of Friedrichshafen, Germany

[73] Assignee: ZF Friedrichshafen AG, Friedrichshafen, Germany

[21] Appl. No.: 232,196

[22] PCT Filed: Nov. 12, 1992

[86] PCT No.: PCT/EP92/02603

§ 371 Date: Apr. 28, 1994

§ 102(e) Date: Apr. 28, 1994

[87] PCT Pub. No.: WO93/10379

PCT Pub. Date: May 27, 1993

[30] Foreign Application Priority Data

Nov. 12, 1991 [DE] Germany ............. 41 37 142.9

[51] Int. Cl.$^6$ .................................................. F16H 63/30
[52] U.S. Cl. ................................................................. 74/335
[58] Field of Search .................................................. 74/335

[56] References Cited

U.S. PATENT DOCUMENTS

| | | | |
|---|---|---|---|
| 2,462,779 | 2/1949 | Russell | 74/365 |
| 2,649,813 | 8/1953 | Barth et al. | 74/335 |
| 2,754,692 | 7/1956 | Russell | 74/473 R |
| 4,981,202 | 1/1991 | Leigh-Monstevens et al. | 192/92 |
| 5,150,629 | 9/1992 | Morris et al. | 74/337.5 |
| 5,239,894 | 8/1993 | Oikawa et al. | 74/335 |
| 5,251,503 | 10/1993 | Morris et al. | 74/337.5 |

FOREIGN PATENT DOCUMENTS

| | | |
|---|---|---|
| 262791 | 6/1968 | Austria . |
| 0198111 | 10/1986 | European Pat. Off. . |
| 653127 | 11/1937 | Germany . |
| 1450891 | 9/1970 | Germany . |
| 2806907 | 8/1978 | Germany . |
| 2097077 | 10/1982 | United Kingdom . |

*Primary Examiner*—Dirk Wright
*Attorney, Agent, or Firm*—Davis, Bujold & Streck

[57] ABSTRACT

A gearshifting arrangement for actuating motor vehicle multi-speed transmissions wherein an electromotive actuation takes place, it being essential that only one electric motor (1) connected with only one cam transmission (4) and only one gearshifting element are provided for actuating all gearshifting sets. The gearshifting element is a connecting rod (5) capable of moving parallel to the axis of the transmission wheels and in which are provided individually actuatable coupling mechanisms (11) respectively associated with a gearshifting lever. The electric motor (1), the spatial cam transmission (4) and the connecting rod (5) are coaxially arranged whereby a very simple and space-saving embodiment is achieved.

15 Claims, 1 Drawing Sheet

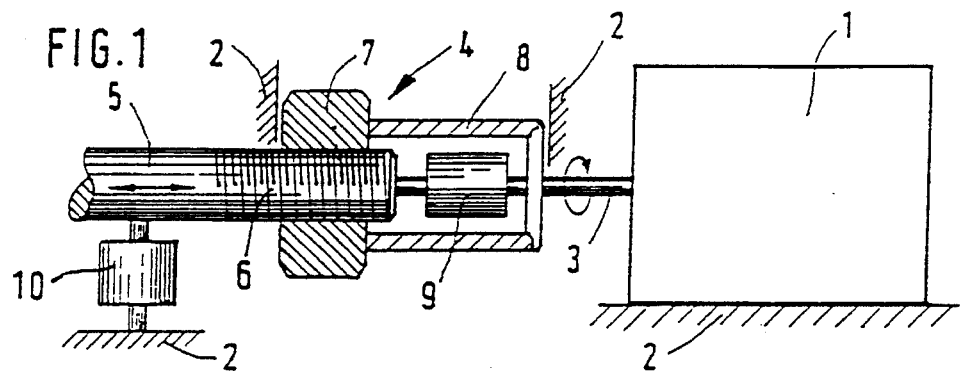
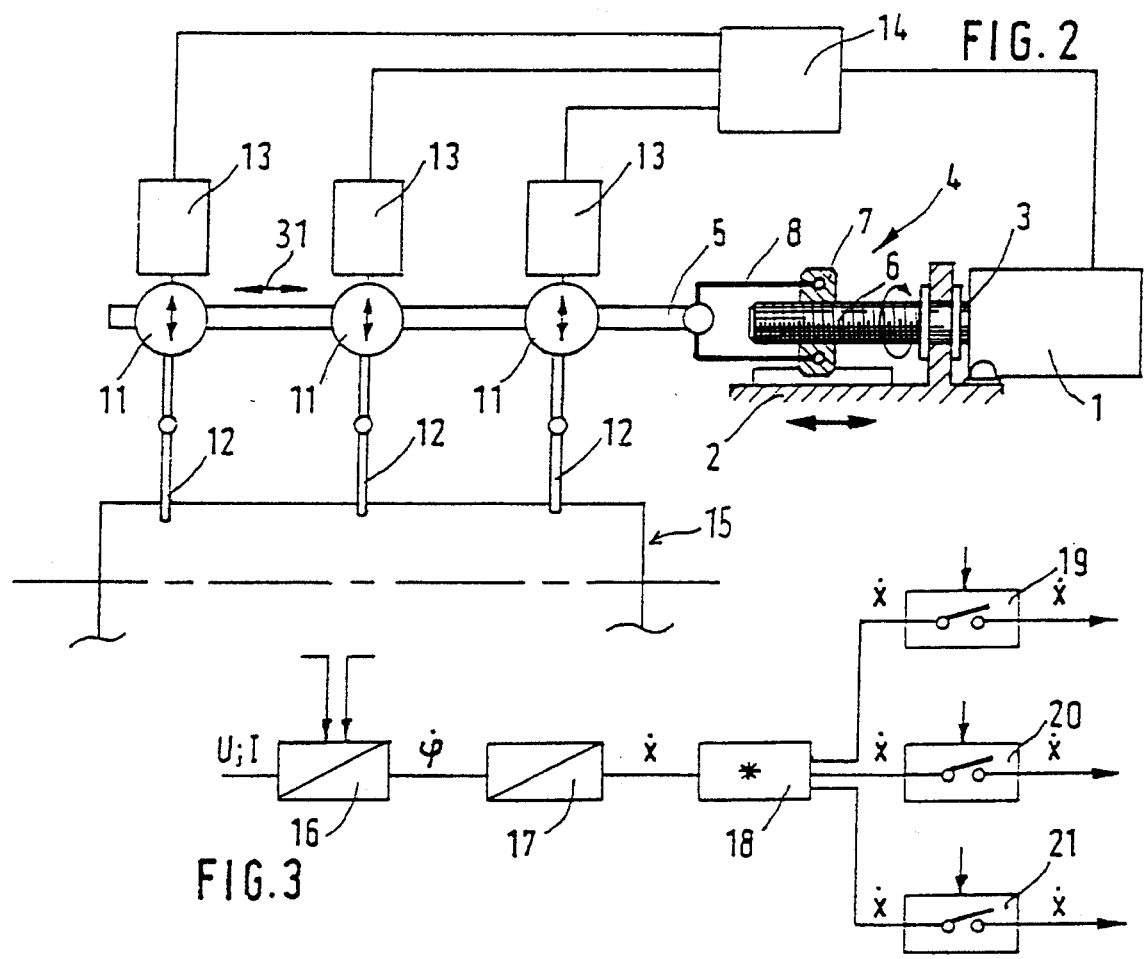

GEARSHIFTING ARRANGEMENT FOR ACTUATING MOTOR VEHICLE MULTI-SPEED GEARBOXES

FIELD OF THE INVENTION

The invention concerns gearshifting arrangements for actuating motor vehicle multi-speed transmissions wherein electric motors are used for actuating the gearshifting sets of the transmission.

BACKGROUND OF THE INVENTION

Existing multi-speed transmissions include gearshifting arrangements where the gearshifting force required is partly or wholly supplied by the vehicle's own source of energy. They have the disadvantages that no simple control of the gearshifting force is possible (especially pneumatically) and that relatively expensive parts are needed. Sources of energy likewise are not available in all vehicles wherefore they must be additionally installed when required.

An electric power supply, which performs a multiplicity of tasks in a vehicle, offers itself as a source of energy present in any vehicle. A modification for the purpose of electronic control is therefore relatively easily performed. The trend in modern vehicles is toward electronic control of vehicle functions (for instance, automatic transmission, injection and ignition systems, ASC). It appears important to supply the same energy to the control range and the power range. In an electrically actuated transmission, this means that an unnecessary change in the kind of energy used in the system for shift control to a different kind of energy for production of shifting force is avoided. Advantages are to be seen, for instance, in the travel and time-dependent control of the shifting force.

Such gearshifting arrangements are known in many different designs. But common to all is that they use, a separate electric motor for activation of each gearshifting set, with the result being a relatively complex construction coupled with the need of a comparatively large space.

Thus, U.S. Pat. Nos. 2,462,779 and 2,754,692 show a transmission control where an electric motor, having a ball threaded spindle (spatial transmission) secured to its shaft, is associated with each gearshifting lever which interacts with a relatively complex angular lever-spiral spring system. Consequently, three electric motors with three motion-transmitting devices are situated in a six-speed transmission with the result, especially in the latter, of a relatively multi-part, complex construction with great complexity and that demands a relatively large space.

Gearshifting arrangements in which worm drives are used are also known. On the respective electric motor associated with a gearshifting lever, a worm is situated, substantially coaxially with the motor shaft or secured thereto, which interacts with a worm gear and a complex lever system. Austrian patent 262,791 shows a worm drive interacting with a crank drive which, in turn, moves the gearshifting lever. In the gearshifting arrangement of EP-AZ O 198 111, the worm gear interacts with a rack which is substantially parallel to the axis of the transmission wheels and, in turn, actuates the gearshifting lever via a lever-spring system.

In addition, there are known gearshifting arrangements which use electric motors combined with cam discs, and a stepdown gear that is situated between the motor and the cam disc or cam. GB-A 2097077 shows a gearshifting arrangement wherein the cam actuates a sliding device that runs against spring tension and moves the end of the gearshifting lever provided with a ball. DE-OS 28 06 907 shows a gearshifting arrangement which is provided with a cam disc provided with cams on the front side. Sliding blocks are moved via dogs by means of a guide roller combined with an auxiliary lever, an actuating lever and crank arms.

The problem to be solved by this invention is to provide a gearshifting arrangement, of the above kind, having an economic structure, manufacture and assembly (that is, simple, reliable and space-saving).

SUMMARY OF THE INVENTION

This problem is solved according to the invention by a gearshifting arrangement.

According to the invention that has only one electric motor in combination with only one cam transmission and only one gearshifting element for actuation of all the gearshifting sets. The parts are thus reduced to a minimum and, in particular, those parts that take much space, such as electric motors, are eliminated leaving only one motor (independent of the number of gearshifting sets present). Thereby a compact assembly is obtained which allows the use of a relatively small motor torque for the drive, since strong adjusting forces can be achieved. Also, the torque can be easily controlled by the electric motor via the motor current.

In a further development of the concept of the invention, the gearshifting element consists of a connecting rod movable substantially parallel to the axis of the gears and several separately actuatable coupling mechanisms associated with the respective gearshifting levers, each producing in an actuated state an operative connection between a connecting rod and one of the gearshifting levers. At the same time, it is a further advantage if the spatial cam transmission, situated coaxially with the shaft of the electric motor, is a threaded spindle with a threaded nut running thereon. By virtue of the coaxial arrangement, that is, the axial alignment of the electric motor with the threaded spindle and the connecting rod, a very space-saving simple construction is created which can be placed without difficulty in the interior of the transmission housing.

According to another advantageous embodiment, the cam transmission is firmly connected by one of the two parts thereof with the connecting rod, whereby the coaxial alignment of the essential component parts of the gearshifting arrangement with respect to each other can be easily achieved.

The threaded spindle can be connected with the connecting rod to form a substantially one-piece part while the threaded nut is non-rotatably and axially non-slidably connected with the motor shaft. This affords the possibility, for instance, of placing an adequate thread, upon which the threaded nut runs, on the end of the connecting rod on the motor side. The thread obviously can be placed directly on the connecting rod or a separate threaded part can be, in a manner known per se, connected in one piece with the connecting rod and made of sectional steel. At the same time, two clutch devices, working substantially in opposite directions, can be associated with the threaded spindle, that is, in this case with the connecting rod having the threaded part provided thereon. To produce the gearshifting force (adjusting movement), the threaded spindle/connecting rod is non-torsionally but axially displaceably connected or coupled with the housing; while for speed selection, that is, for activating the respective gearshifting set, the threaded spindle/connecting rod can be non-rotatably and axially immovably connected with the threaded nut/motor shaft. Consequently, if the first coupling mechanism, that is, the clutch .which non-rotatably connects the threaded spindle with the motor shaft, is disengaged and simultaneously the second coupling mechanism, that is, the clutch which makes the threaded spindle non-turnable but axially displaceable, is engaged, then, depending on the rotary movement of the motor shaft, the threaded spindle is axially moved via the threaded nut which rotates together with the motor shaft whereby the adjusting movement (gearshifting movement) is effected. If both coupling mechanisms are oppositely activated, that is, the first clutch engaged (a non-rotatable connection of the threaded spindle with the motor shaft) and the second coupling mechanism disengaged (the threaded spindle released for rotation), then the threaded spindle can be closely identified with the rotatory movement of the motor, that is, it can carry out corresponding angle-adjusting movements (speed selection). This affords the possibility of carrying out the speed selection by said rotatory movement of the threaded spindle, that is, of the connecting rod, through a corresponding gearshifting arrangement which responds to specific angle standards. Consequently a very important advantage is achieved, namely, that with one and the same part, that is, the connecting rod combined with only one motor, and therefore a single adjusting mechanism, both the adjusting movement (gearshifting force) and the speed selection can be easily carried out.

According to a further development of the concept of the invention, the connecting rod can be non-rotatably and non-slidably connected with the threaded nut, the threaded nut being movable axially and rotatably movable upon the motor shaft provided with the threaded spindle. By adequate rotational movement of the motor shaft, the nut and the connecting rod therewith are axially displaced and the necessary adjusting movement is effected. Obviously the reverse possibility exists also, like in FIG. 1, of providing the threaded spindle firmly connected with the connecting rod while the threaded nut is provided on the motor shaft, for instance, by designing the shaft as a hollow shaft. In this embodiment, no additional guidance of one of the two parts of the spatial cam transmission has to be effected since said guidance is already provided by the connecting rod on which the threaded spindle is fastened. In this embodiment, for carrying out the speed selection, several separately actuatable coupling mechanisms, each associated with a gearshifting lever, are provided for individually fixing the gearshifting levers on the rod or on the transmission housing and can be associated with the connecting rod. The coupling mechanisms in an unactuated state, that is, when no coupling force is operative, immovably fix a respective unactuated gearshifting lever in a neutral position on a part fixed to the housing, it being possible, at the same time, for the connecting rod to carry out the gearshifting movement unhindered. Thereby no unintended movement of the gearshifting levers leading to an unintended engagement of speed can occur. In an actuated or engaged state, the separately actuatable coupling mechanisms produce an operative connection between the connecting rod and a respective gearshifting lever, while simultaneously releasing the connection of the gearshifting lever with the part fixed to the housing so that the gearshifting levers can carry out the gearshifting movement of the connecting rod unhindered. Consequently, the multiple gearshifting levers of the multi-speed transmission of the motor vehicle are separately coupled on a single connecting rod for transmitting the gearshifting force. The coupling mechanism is designed so that each coupling mechanism can be actuated independently of the others but, at the same time, grip the same connecting rod available for actuating the remaining gearshifting levers.

In a further development of the concept of the invention, the coupling mechanism is operatively designed perpendicular to the gearshifting movement of the connecting rod and can be activated via solenoids, or pneumatic or hydraulic cylinders, or actuating devices containing other mechanisms. It is obvious that when using an electric motor for actuating the connecting rod, the actuation of the coupling mechanisms via solenoids is preferred. Here the electronic control units which control the adjusting movement and speed selection can also be combined to form a unit.

It is advantageous, according to the invention, that the gearshifting mechanism be controlled by an electronic system. The motor for adjusting movement and adjusting force production can be controlled depending on the speed to be engaged at the moment. The speed selection mechanism also can be controlled via an electronic system. By said system the same motor used for producing the adjusting force is controlled according to the selection of the respective gearshifting set. It is to be assumed here that the electronic control has to be designed according to the two basic embodiments of the idea of the invention, that is, in the first case, that the electric motor be controlled for both functions respectively by the electronic system in a manner such that its shaft carries out the movements needed both for the adjusting movement and for the speed selection, it being necessary in the latter, in addition, to control the engagement and disengagement of the coupling mechanisms. In the second embodiment, the electric motor will carry out only the rotation needed for the adjusting movement of the connecting rod while the actuation of the coupling mechanisms, even though separately carried out, is coupled with the motor control.

BRIEF DESCRIPTION OF THE DRAWINGS

The invention is explained in detail herebelow with the aid of two embodiments having reference to the drawings. In the drawings:

FIG. 1 is a diagrammatic illustration of a first embodiment of the gearshifting arrangement, FIG. 2 is a diagrammatic illustration of a second embodiment of the gearshifting arrangement, and FIG. 3 is a basic operational structure according to which the two mechanisms of the gearshifting arrangement of the invention are oriented according to FIGS. 1 and 2.

DETAILED DESCRIPTION OF THE PREFERRED EMBODIMENTS

An electric motor 1, provided as one of the most essential parts of the gearshifting arrangement of the invention, is secured to the transmission housing or a part 2 firmly connected with the transmission housing. The motor shaft 3 is operatively connected with a spatial cam transmission 4 which, in turn, is operatively connected with a connecting rod 5. The motor shaft 3, the transmission 4 and the connecting rod 5 are coaxially aligned whereby the adjusting movement of the connecting rod substantially takes place in an axial direction of the motor shaft 3 and the gear sets 15. The spatial cam transmission 4 consists of a threaded spindle 6 upon which runs a threaded nut 7.

In the embodiment of FIG. 1, the threaded spindle 6 is secured to the motor side end of the connecting rod 5 so as to constitute a one-piece part. The threaded spindle part of the connecting rod will now be discussed. The threaded nut 7 is connected with the motor shaft 3, for instance, via several rigid connecting arms or a flange-like part 8, or any construction that bridges the space between the front side of the threaded spindle and the motor shaft. The threaded nut 7 is here non-movably but rotatably locked, via the motor shaft 3, to the housing or the part 2 firmly connected with the housing.

Two coupling mechanisms 9, 10 are associated with the threaded spindle 6. The first coupling mechanism 9 is substantially situated between the front side of the threaded spindle 6 and the motor shaft 3 and connects them so that the threaded spindle 6 is immovably fixed or released from connection with the nut 7 and the shaft 3. The second coupling mechanism 10 connects the threaded spindle 6 with the housing or the housing part 2 so that the threaded spindle does not carry out any rotary movement but only a translatory movement. Both coupling mechanisms 9 and 10 work oppositely, that is, when the clutch 9 is disengaged the clutch 10 is engaged or viceversa.

The gearshifting arrangement shown on FIG. 1 operates as follows: When the clutch 9 is disengaged and the clutch 10 is engaged, the torque of the electric motor 1 is transmitted via shaft 3 and connecting arms 8 to the threaded nut 7, that is, the nut 7 rotates together with the shaft 3. But since the nut 7 is prevented from effecting an axial movement, the rotation thereof will cause the threaded spindle 6 to carry out a corresponding translatory movement, since the coupling mechanism 10 prevents it from effecting a rotational movement and only allows an axial sliding movement. The threaded spindle 6 moves the connecting rod 5 with which it then moves the coupled gearshifting levers.

If the clutch 9 is now engaged and the clutch 10 is at the same time disengaged, the threaded spindle 6 and the connecting rod 5 become non-rotatably and fixedly connected together with the shaft 3, that is, the spatial cam transmission 4 is briefly engaged so that the connecting rod 5 fully identifies with the rotary movements of the shaft 3. On the connecting rod 5 is provided, corresponding to the number of gearshifting sets, a number of coupling mechanisms which respond to specific pivoting angles of the connecting rod and connect the corresponding gearshifting levers with the connecting rod for synchronization.

In the embodiment shown on FIG. 2, the threaded spindle 6 of the spatial cam transmission 4 is directly fastened coaxially on shaft 3 or can be part of the shaft 3 by placing an adequate thread in the shaft 3. The threaded nut 7 is non-rotatably and non-slidably linked in axial alignment with the connecting rod 5. But, at the same time, the nut 7 is non-rotatably and axially slidably situated on the housing 2 or on the part firmly connected with the housing. Obviously it is also possible, like in FIG. 1, to provide the threaded spindle part firmly linked to the connecting rod 5 while the threaded nut is provided on the motor shaft 3, for instance, by designing the shaft as a hollow shaft. In this embodiment, no additional guidance of one of the two parts of the spatial cam transmission is required since said guidance is already provided by the connecting rod to which the threaded spindle is secured.

Operative coupling mechanisms 11 are provided on the rod 5, across the direction of displacement 14 of the rod 5, which connect the corresponding gearshifting levers 12 with the connecting rod 5. Associated with each coupling mechanism 11 and thus with each of the gearshifting levers 12 is an actuating means 13 which brings the coupling mechanism to a coupling state, or moves it out of the coupling state with the connecting rod and non-slidably connects the gearshifting levers with the transmission housing simultaneously releasing the connecting rod. The actuating means are electromagnetic means which are individually engaged via an electronic control unit, as may be needed. The control unit 14 is connected with the control unit of the electric motor or can contain, at the same time, the control unit for the electric motor 1.

The gearshifting arrangement of FIG. 2 operates as follows: If a specific speed is engaged, then the actuating means 13 associated with the corresponding gearshifting set or with one of the gearshifting levers 12 is actuated, via the electronic control unit 14, which in turn actuates the corresponding coupling mechanism 11 and therewith operatively connects the moved gearshifting lever 12 with the connecting rod 5. The two remaining actuating means are not engaged so that the coupling mechanisms 11 thereof release the corresponding gearshifting levers 12 from the operative connection with the connecting rod 5 and fixes them to the transmission housing. Thereafter, the electric motor is actuated and, depending on which of the two speeds of the actuated gearshifting set is to be engaged, it must produce the corresponding clockwise or counterclockwise rotation of the shaft 3 and of the threaded spindle 6 herewith. By virtue of the rotation of the threaded spindle, the non-torsionally held threaded nut 7 will carry out a translatory movement to the left or to the right as seen on the plane of the drawing. Thereby the connecting rod 5, which is linked to the nut 7 performs a translatory movement to the left or to the right, and the coupled gearshifting lever 12 performs a corresponding swivelling movement and moves a gearshifting sleeve, not shown, into engagement with the gear pair corresponding to the selected speed.

FIG. 3 illustrates a basic operational structure in accordance with which is oriented the mechanism of the gearshifting arrangement of the invention. At 16 and 17, conversion of the electric energy takes place to mechanical energy by means of the electric motor 1. At 16 a change in rotary movement occurs simultaneously with a torque control and a control in the direction of movement. The conversion to a translatory movement, which constitutes the conversion of the rotational movement of the motor shaft into the translational shifting/adjusting movement of the connecting rod, takes place at 17. 18 shows the branching of the gearshifting movement/source, here in three branches, corresponding to the three coupling mechanisms of FIG. 2. The translatory movement is relayed to three mechanisms 19, 20, 21 which are separately engageable via a corresponding coupling/uncoupling mechanism. It is to be understood that the operations develop substantially in linear succession and that a branching occurs practically only in the last or penultimate section.

| List of Reference Numerals | |
| --- | --- |
| 1 | electric motor |
| 2 | housing/part |
| 3 | motor shaft |
| 4 | spatial cam transmission |
| 5 | connecting rod |
| 6 | threaded spindle |
| 7 | threaded nut |
| 8 | connecting arms |
| 9 | first clutch transmission |

| List of Reference Numerals | |
|---|---|
| 10 | second clutch transmission |
| 11 | coupling mechanism |
| 12 | shifting lever |
| 13 | actuating means |
| 14 | electronic control unit |
| 15 | — |
| 16 | change |
| 17 | change |
| 18 | branching |
| 19 | coupling/uncoupling |
| 20 | coupling/uncoupling |
| 21 | coupling/uncoupling |

We claim:

1. A gearshifting arrangement for actuating motor vehicle multi-speed transmissions comprising:

a single electric motor (1) for selectively producing all necessary gearshifting force and gearshifting movement in each of several gearshifting levers (12) of such a transmission, a single spatial cam transmission (4) connected in substantial axial alignment with a shaft (3) of said electric motor (1), a single connecting rod (5) operative between said cam transmission (4) and said gearshifting levers (12), wherein said spatial cam transmission (4) is a threaded spindle (6) with a threaded nut (7) running thereon and the motor shaft (3) is operatively connected with said single gearshifting rod (5), via said single cam transmission (4), for selectively individually shifting all of the gearshifting levers (12), and said connecting rod (5) reciprocally moves in a direction substantially parallel to an axis of rotation of gears of the transmission, several coupling mechanisms (11) are respectively associated with corresponding said gearshifting levers (12) and are individually actuatable for gear selection, when in an actuated state, each said coupling mechanism produces an operative connection between said connecting rod (5) and the corresponding gearshifting lever (12).

2. A gearshifting arrangement according to claim 1, wherein one of the threaded spindle and the threaded nut of said cam transmission (4) is non-rotatably and non-slidably connected with said connecting rod (5).

3. A gearshifting arrangement according to claim 2, wherein said threaded spindle (6) is integrally connected with said connecting rod (5) to form a substantial one-piece unitary part while said threaded nut (7) is non-rotatably and axially non-slidably connected with said motor shaft (3).

4. A gearshifting arrangement according to claim 3, wherein, two clutch means, working in substantially opposite directions, are associated with said threaded spindle (6) and by means of which said threaded spindle and said connecting rod (6, 5) are selectively:

a) non-rotatably but axially slidably connected with said housing (2) for producing the gearshifting force and movement, and b) non-rotatably and axially non-slidably connected with said threaded nut and said motor shaft (7, 3) for speed selection.

5. A gearshifting arrangement according to claim 2, wherein said threaded nut (7) is non-rotatably and non-translatably connected to said connecting rod (5) and is axially slidably and non-rotatably connected with said housing (2), while said threaded spindle (6) is non-rotatably and non-translatably secured to said motor shaft (3).

6. A gearshifting arrangement according to claim 2, comprising several individually actuatable coupling mechanisms (11) each individually interacting with a said corresponding gearshifting lever for carrying out speed selection, by fastening said corresponding gearshifting levers (12) alternately to said connecting rod (5) and to a housing (2) of said transmission housing.

7. A gearshifting arrangement according to claim 6, wherein said coupling mechanisms (11) operate in a direction perpendicular to the gearshifting movement of said connecting rod (5) and are individually activated with fastening devices (13) comprising one of an electric, electromagnetic, pneumatic and hydraulic means.

8. A gearshifting arrangement according to claim 6, wherein said coupling mechanisms (11) operate in a direction perpendicular to the gearshifting movement of said connecting rod (5) and are individually actuated by rotating said connecting rod and threaded spindle (5, 6), for selectively fastening one of said gearshifting levers (12), depending on the rotational angle of said connecting rod (5), with said connecting rod.

9. A gearshifting arrangement according to claim 1, comprising at least one electronic control (14) associated with said electric motor (1) for controlling the gearshifting movement, the gearshifting force and the speed selection.

10. A gearshifting arrangement according to claim 4, wherein said coupling mechanisms (11) operate in a direction perpendicular to the gearshifting movement of said connecting rod (5) and are individually actuated by rotating said connecting rod and threaded spindle (5, 6), for selectively fastening one of said gearshifting levers (12), depending on the rotational angle of said connecting rod (5), with said connecting rod.

11. A gearshifting arrangement for actuating motor vehicle multi-speed transmissions comprising:

a single electric motor (1) for selectively producing all necessary gearshifting force and gearshifting movement in each of several gearshifting levers (12) of such a transmission, a single spatial cam transmission (4) connected in substantial axial alignment with a shaft (3) of said electric motor (1), a single connecting rod (5) operative between said cam transmission (4) and said gearshifting levers (12), wherein said single electric motor (1) is operatively connected with said single gearshifting rod (5), via said single cam transmission (4), for selectively individually shifting each of the gearshifting levers (12), and said connecting rod (5) reciprocally moves in a direction substantially parallel to an axis of rotation of gears of the transmission, several coupling mechanisms (11) are respectively associated with corresponding said gearshifting levers (12) and are individually actuatable for gear selection, when in an actuated state, each said coupling mechanism produces an operative connection between said connecting rod (5) and the corresponding gearshifting lever (12).

12. A gearshifting arrangement for actuating motor vehicle multi-speed transmissions comprising:

a single electric motor (1) for selectively producing all necessary gearshifting force and gearshifting movement in each of several gearshifting levers (12) of such a transmission, a single spatial cam transmission (4) connected in substantial axial alignment with a shaft (3) of said electric motor (1), a single connecting rod (5) operative between said cam transmission (4) and said gearshifting levers (12), a shaft (3) of said single electric motor (1) is operatively connected with said single gearshifting rod (5), via said single cam transmission (4), for selectively individually shifting all of the gearshifting levers (12), wherein said spatial cam transmission (4) comprises a threaded spindle (6) integrally connected with said connecting rod (5) to form a one-piece unitary part and a threaded nut (7) non-rotatably and axially non-slidably connected with said motor shaft (3) that runs on the threaded spindle, and said connecting rod (5) reciprocally moves in a direction substantially parallel to an axis of rotation of gears of the transmission, several coupling mechanisms (11) are respectively associated with corresponding said gearshifting levers (12) and are individually actuatable for gear selection, when in an actuated state, each said coupling mechanism produces an operative connection between said connecting rod (5) and the corresponding gearshifting lever (12).

13. A gearshifting arrangement according to claim 12, comprising several individually actuatable coupling mechanisms (11) each individually interacting with a said corresponding gearshifting lever for carrying out speed selection, by fastening said corresponding gearshifting levers (12) alternately to said connecting rod (5) and to a housing (2) of said transmission housing.

14. A gearshifting arrangement according to claim 13, wherein said coupling mechanisms (11) operate in a direction perpendicular to the gearshifting movement of said connecting rod (5) and are individually activated with fastening devices (13) comprising one of an electric, electromagnetic, pneumatic and hydraulic means.

15. A gearshifting arrangement according to claim 13, wherein said coupling mechanisms (11) operate in a direction perpendicular to the gearshifting movement of said connecting rod (5) and are individually actuated by rotating said connecting rod and threaded spindle (5, 6), for selectively fastening one of said gearshifting levers (12), depending on the rotational angle of said connecting rod (5), with said connecting rod.

* * * * *